United States Patent [19]

Kim

[11] Patent Number: 5,457,542
[45] Date of Patent: Oct. 10, 1995

[54] CAPTION DISPLAY APPARATUS FOR VCR

[75] Inventor: Duk Y. Kim, Seoul, Rep. of Korea

[73] Assignee: Goldstar Co., Ltd., Seoul, Rep. of Korea

[21] Appl. No.: 144,604

[22] Filed: Nov. 1, 1993

Related U.S. Application Data

[63] Continuation of Ser. No. 933,676, Aug. 24, 1992, abandoned.

[30] Foreign Application Priority Data

Aug. 27, 1991 [KR] Rep. of Korea ............... 14867/1991

[51] Int. Cl.⁶ .................................................. H04N 5/783
[52] U.S. Cl. ........................ 358/310; 358/335; 358/312
[58] Field of Search ......................... 358/335, 342, 358/341, 343, 310, 312; 360/33.1, 10.1, 32, 72.1, 14.3; 348/239, 468, 563; H04N 5/783

[56] References Cited

U.S. PATENT DOCUMENTS

| | | | |
|---|---|---|---|
| 4,800,447 | 1/1989 | Toba | 358/312 |
| 4,821,102 | 4/1989 | Ichikawa et al. | 358/183 |
| 5,019,920 | 5/1991 | Yoshimoto et al. | 360/22 |
| 5,045,944 | 9/1991 | Kim | 358/183 |
| 5,089,899 | 2/1992 | Nomura et al. | 358/335 |
| 5,097,348 | 3/1992 | Suetaka | 358/335 |
| 5,124,814 | 6/1992 | Takahashi et al. | 358/343 |
| 5,239,429 | 8/1993 | Hoshi | 360/72.1 |

FOREIGN PATENT DOCUMENTS

| | | |
|---|---|---|
| 0241683 | 2/1987 | European Pat. Off. . |
| 2170351 | 12/1984 | United Kingdom . |
| 9200647 | 1/1992 | WIPO . |

*Primary Examiner*—Tommy P. Chin
*Assistant Examiner*—Huy Nguyen

[57] ABSTRACT

A caption display apparatus for a video cassette recorder (VCR), comprising a caption signal detection circuit for detecting a caption signal from a video signal, a caption display signal generation circuit for generating a caption character signal in response to the detected caption signal from the caption signal detection circuit and then outputting a caption display signal as a result of determination of a display size and a display window position of the generated caption character signal, a caption control device for storing the caption display signals from the caption display signal generation circuit and selectively outputting the stored caption display signals in a normal play mode or one of modes other than the normal play mode under selection of the user to perform the caption display for a predetermined time period in the mode selected by the user, and a video/character signal combination circuit for combining the selected caption display signals from the caption control device with the video signal and outputting the combined signals to a monitor so that the caption display is performed on a video picture on a screen of the monitor.

3 Claims, 4 Drawing Sheets

CAPTION DISPLAY APPARATUS FOR VCR

This application is a continuation of application Ser. No. 07/933,676 filed on Aug. 24, 1992, now abandoned.

BACKGROUND OF THE INVENTION

1. Field of the Invention

The present invention relates in general to a caption display of a video cassette recorder, referred to hereinafter as VCR and more particularly to a caption display apparatus for a VCR which is capable of storing caption display signals in a memory and outputting the stored caption display signals to a screen to display them in any operating modes of the VCR under selection of the user.

2. Description of the Prior Art

FIG. 1 illustrates block diagram of a conventional caption display apparatus for a VCR. As shown in this drawing, the conventional caption display apparatus for the VCR comprises a video signal processing circuit 10 for receiving a video signal, processing luminance and chrominance signals of the inputted video signal and correcting vertical and horizontal synchronous signals of the inputted video signal, a caption signal detection circuit 20 for detecting a caption signal from the processed video signal from the video signal processing circuit 10, a caption display signal generation circuit 30 for generating a caption character signal in response to the detected caption signal from the caption signal detection circuit 20 and then outputting a caption display signal as a result of determination of a display size and a display window position of the generated caption character signal, a caption display control switch 40 for transferring the caption display signal from the caption display signal generation circuit 30 in only a normal play mode, and a video/character signal combination circuit 50 for combining the caption display signal transferred in only the normal play mode by the caption display control switch with the processed video signal from the video signal processing circuit 10 and outputting the combined signals to a monitor 60 so that the caption display is performed on a video picture on a screen of the monitor 60.

The video signal processing circuit 10 includes a luminance/chrominance processor 11, a buffer 12 and a synchronous corrector 13 and the caption signal detection circuit 20 includes a low pass filter 21, a video buffer 22, a line selector 23 and a data slicer and synchronous separator circuit 24. Also, the caption display signal generation circuit 30 includes a character generator 31, a character memory 32 and a display controller 33.

The operation of the conventional VCR caption display apparatus with the above-mentioned construction will now be described.

In operation, upon receiving the video signal on which the caption signal is carried, the video signal processing circuit 10 processes the luminance and chrominance signals of the inputted video signal and corrects the vertical and horizontal synchronous signals of the inputted video signal. In other words, in the video signal processing circuit 10, the luminance and chrominance signals of the inputted video signal are processed by the luminance/chrominance processor 11 and the vertical and horizontal synchronous signals of the inputted video signal are corrected by the synchronous corrector 13. Also in the buffer 12, noise of the inputted video signal is removed. The processed video signal from the video signal processing circuit 10 is applied to the caption signal detection circuit 20 and the video/character signal combination circuit 50. It is noted herein that the caption signal is carried in a predetermined interval (equalizing pulse interval) of a vertical blanking interval of the processed video signal from the video signal processing circuit 10.

In the caption signal detection circuit 20, the processed video signal from the video signal processing circuit 10 is low pass-filtered by the low pass filter 21 and then buffered by the video buffer 22, which applies the buffered video signal to the data slicer and synchronous separator circuit 24. Also, the line selector 23 generates a line select signal for designation of the interval of the video signal in which the caption signal is carried. The generated line select signal from the line selector 23 is also applied to the data slicer and synchronous separator circuit 24.

Then in the data slicer and synchronous separator circuit 24, from the video signal is sliced the caption signal which is carried in the predetermined interval (equalizing pulse interval) of the vertical blanking interval of the video signal, and the vertical and horizontal synchronous signals are separated from the video signal. As a result, the resulting caption signal is detected from the video signal in the data slicer and synchronous separator circuit 24.

Upon detection of the caption signal, the caption display signal generation circuit 30 generates the caption character signal in response to the detected caption signal and then outputs the caption display signal as a result of determination of the display size and the display window position of the generated caption character signal. Namely, in the caption display signal generation circuit 30, the character generator 31 addresses the character memory 32 according to the detected caption signal. As a result, the caption character signal is generated from the addressed location of the character memory 32. Then, the size and the window position when the generated caption character signal is displayed are determined under the control of the display controller 33. As a result of the determination of the display size and the display window position of the generated caption character signal, the caption display signal is outputted from the display controller 33.

The caption display signal from the display controller 33 is transferred to the video/character signal combination circuit 50 in only the normal play mode by the caption display control switch 40. The caption display control switch 40 is turned off in only the normal play mode under control of a controller (not shown), in order to transfer the caption display signal from the display controller 33 to the video/character signal combination circuit 50 in only the normal play mode. On the other hand, the caption display control switch 40 is turned on in modes (for example, Slow, Still, Cue, REV. and etc.) other than the normal play mode under the control of the controller, so that the caption display signal from the display controller 33 is bypassed to ground. As a result, in this case, the caption display signal from the display controller 33 is not transferred to but blocked from the video/character signal combination circuit 50.

In the normal play mode, the caption display signal from the display controller 33 is combined in the video/character signal combination circuit 50 with the processed video signal from the video signal processing circuit 10. The combined signals from the video/character signal combination circuit 50 are outputted to the monitor 60. For this reason, the caption display is performed on the video picture on the screen of the monitor 60 in only the normal play mode.

However, the conventional VCR caption display apparatus has a disadvantage, in that the caption display is not performed in the modes other than the normal play mode such as, for example, Slow, Still, Cue, REV. and etc., since it is adapted to be performed in only the normal mode.

SUMMARY OF THE INVENTION

Therefore, it is an object of the present invention to provide a caption display apparatus for a VCR, which is capable of performing caption display in any operating mode of the VCR as well as a normal play mode under selection of the user.

It is another object of the present invention to provide a caption display apparatus for a VCR, which is capable of storing caption display signals in a memory and outputting selected ones of the stored caption display signals under selection of the user to perform the caption display for a predetermined period of time.

In accordance with the present invention, the above objects can be accomplished by a caption display apparatus for a VCR, comprising: a caption signal detection unit for detecting a caption signal from a video signal from a video signal processing unit which processes luminance and chrominance signals of the video signal; a caption display signal generation unit for generating a caption character signal in response to the detected caption signal from the caption signal detection unit and then outputting a caption display signal as a result of determination of a display size and a display window position of the generated caption character signal; a caption control unit for storing the caption display signals from the caption display signal generation unit and selectively outputting the stored caption display signals in a normal play mode or one of modes other than the normal play mode under selection of the user to perform the caption display for a predetermined time period in the mode selected by the user; and a video/character signal combination unit for combining the selected caption display signals from the caption control unit with the video signal from the video signal processing unit and outputting the combined signals to a monitor so that the caption display is performed on a video picture on a screen of the monitor.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 2:
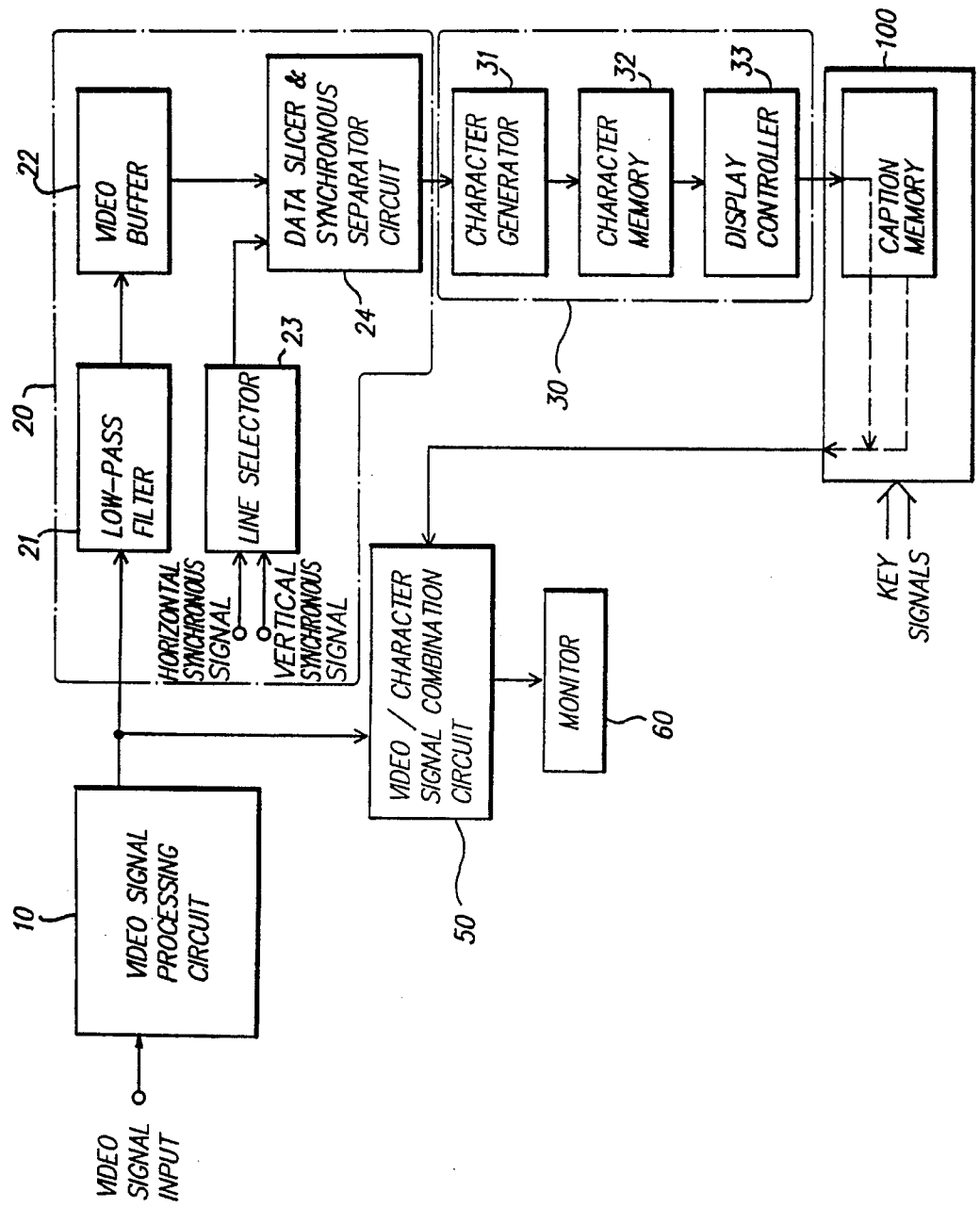
FIG. 2 is a block diagram of a caption display apparatus for a VCR in accordance with the present invention.

Referring to FIG. 2, there is shown a block diagram of a caption display apparatus for a VCR in accordance with the present invention. As shown in this figure, the VCR caption display apparatus of the present invention comprises a caption signal detection circuit 20 for detecting a caption signal from a video signal from a video signal processing circuit, a caption display signal generation circuit 30 for generating a caption character signal in response to the detected caption signal from the caption signal detection circuit 20 and then outputting a caption display signal as a result of determination of a display size and a display window position of the generated caption character signal, a caption control device 100 for storing the caption display signals from the caption display signal generation circuit 30 and selectively outputting the stored caption display signals in a normal play mode or one of modes other than the normal play mode under selection of the user to perform the caption display for a predetermined time period in the mode selected by the user, and a video/character signal combination circuit 50 for combining the selected caption display signals from the caption control device 100 with the video signal from the video signal processing circuit 10 and outputting the combined signals to a monitor 60 so that the caption display is performed on a video picture on a screen of the monitor 60.

Figure 1:
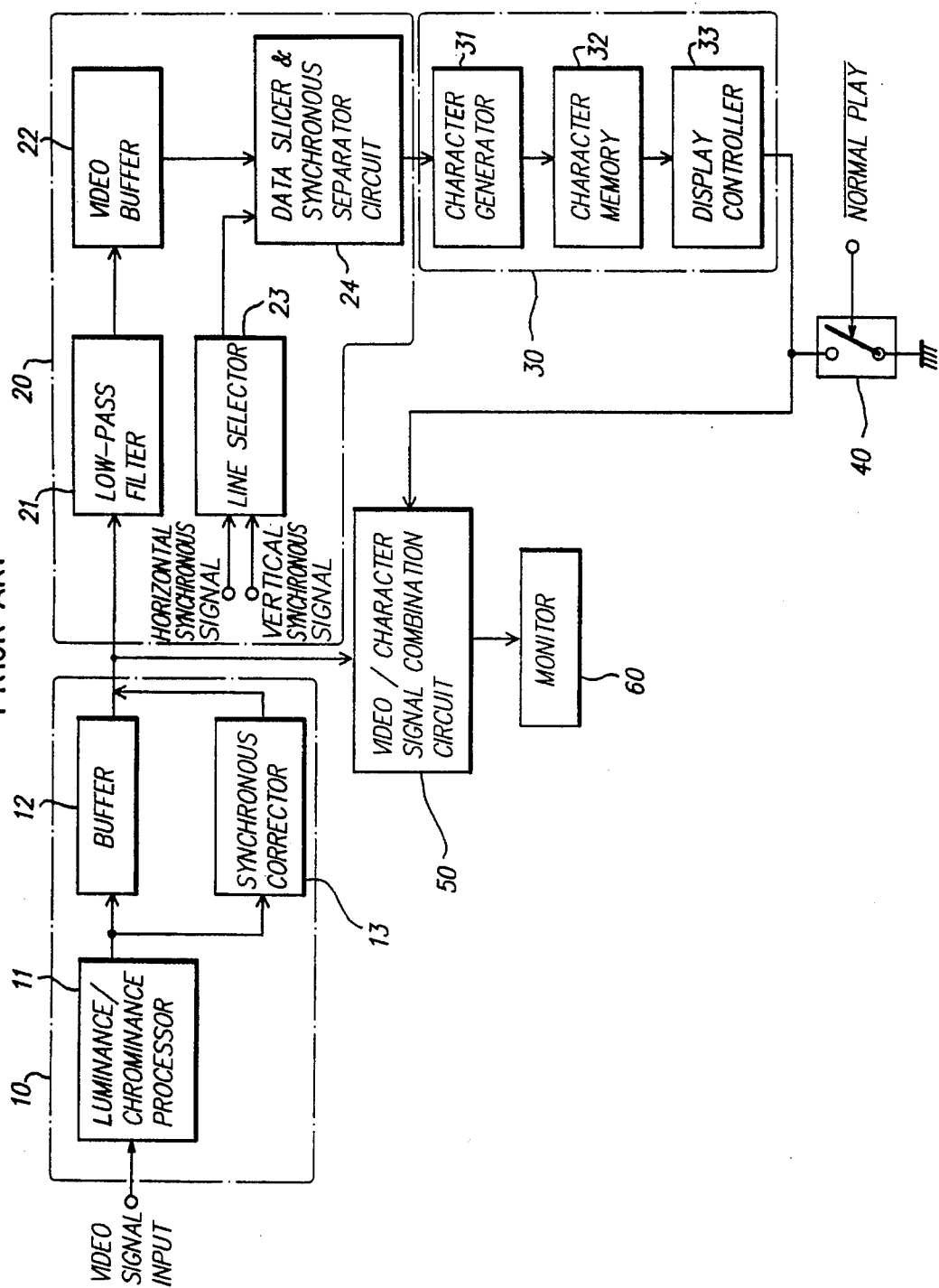
FIG. 1 is a block diagram of a conventional caption display apparatus for a VCR.

Herein, the construction and operation of the video signal processing circuit 10 are the same as those in FIG. 1 and a description thereof will thus be omitted. Also, similarly to those in FIG. 1, the caption signal detection circuit 20 includes a low pass filter 21, a video buffer 22, a line selector 23 and a data slicer and synchronous separator circuit 24 and the caption display signal generation circuit 30 includes a character generator 31, a character memory 32 and a display controller 33.

Figure 3:
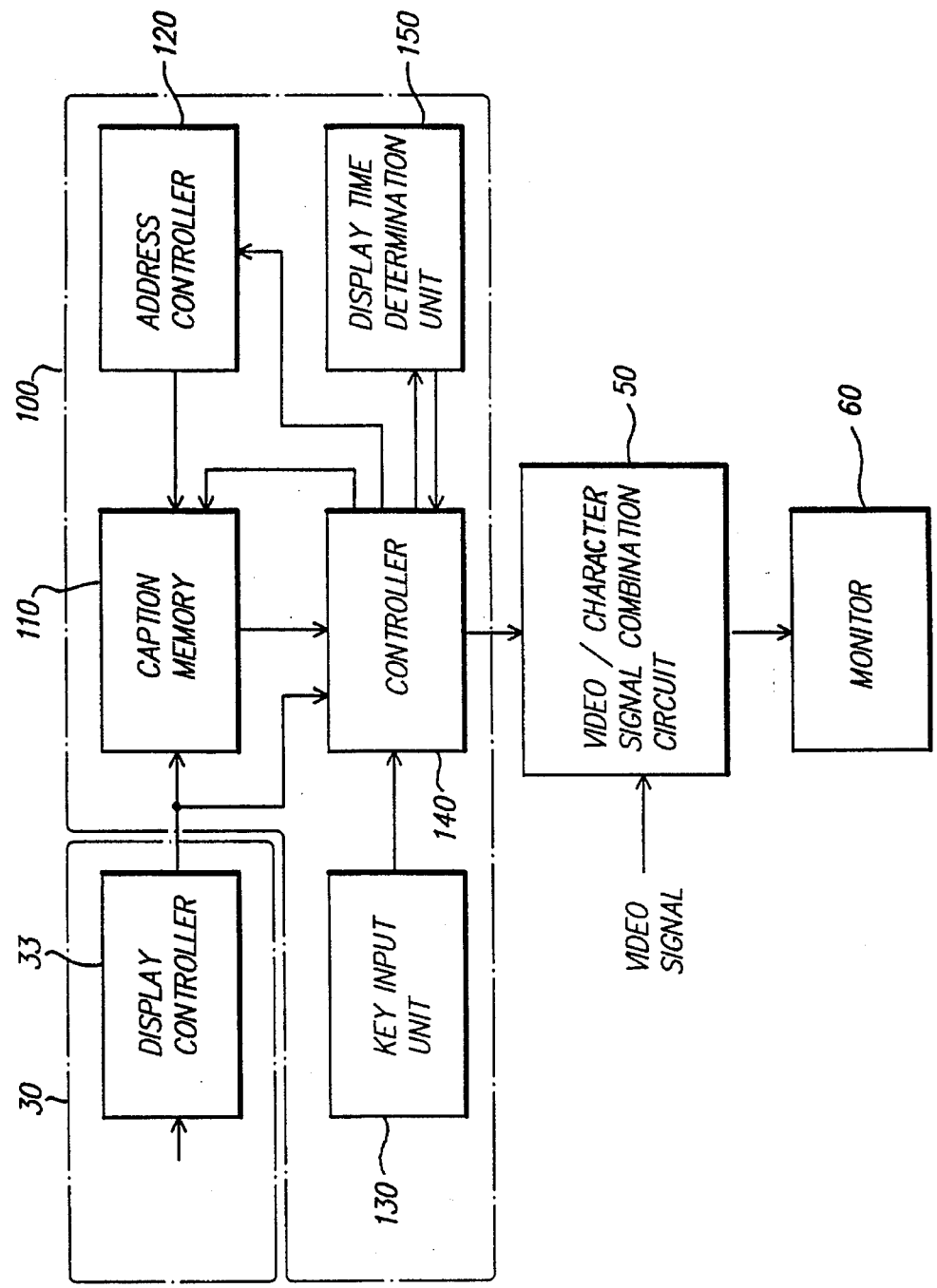
FIG. 3 is a detailed block diagram of a caption control device in the apparatus of FIG. 2.

Referring to FIG. 3, there is shown a detailed block diagram of the caption control device 100 in the apparatus of FIG. 2. As shown in the drawing, the caption control device 100 includes a caption memory 110 for storing the caption display signals from the caption display signal generation circuit 30, a key input unit 130 for inputting key signals for caption display control of the user, an address controller 120 for controlling read/write addresses from/into the caption memory 110, a display time determination unit 150 for determining the time period during which the caption display is performed, and a controller 140 for controlling the address controller 120 and the display time determination unit 150 in response to the caption display control key signals through the key input unit 130 to selectively output the caption display signals stored in the caption memory 110 to the video/character signal combination circuit 50 for the predetermined period of time in the mode selected by the user.

The operation of the VCR caption display apparatus with the above-mentioned construction in accordance with the present invention will hereinafter be described in detail.

In operation, when a video tape on which the caption signal is recorded is played back or when an external video signal or a broadcasting signal on which the caption signal is carried is input for display on the monitor, the video signal from the video signal processing circuit 10 is applied to the caption signal detection circuit 20 and the video/character signal combination circuit 50.

In the caption signal detection circuit 20, the video signal from the video signal processing circuit 10 is low pass-filtered by the low pass filter 21 and then buffered by the video buffer 22, which applies the buffered video signal to the data slicer and synchronous separator circuit 24. Also, the line selector 23 generates a line select signal for designation of a predetermined interval (equalizing pulse interval) of a vertical blanking interval of the video signal in which the caption signal is carried. The generated line select signal from the line selector 23 is also applied to the data slicer and synchronous separator circuit 24.

In the data slicer and synchronous separator circuit 24, the caption signal is sliced from the video signal which carries the caption signal, and the vertical and horizontal synchronous signals are separated from the video signal. As a result, the resulting caption signal is detected from the video signal in the data slicer and synchronous separator circuit 24.

Upon detection of the caption data signal, the caption display signal generation circuit 30 generates the caption character signal in response to the detected caption signal and then outputs the caption display signal as a result of determination of the display size and the display window position of the generated caption character signal. Namely, in the caption display signal generation circuit 30, the character generator 31 addresses the character memory 32 according to the detected caption signal. As a result, the caption character signal is generated from the addressed location of the character memory 32. Then, the size and the window position when the generated caption character signal is displayed are determined under the control of the display controller 33. As a result of the determination of the display size and the display window position of the generated caption character signal, the caption display signal is outputted from the display controller 33.

The caption display signals from the display controller 33 in the caption display signal generation circuit 30 are applied to the caption control device 100. In the caption control device 100, the caption display signals from the display controller 33 are first stored in the caption memory 110 and then outputted directly to the video/character signal combination circuit 50 in the normal play mode under the control of the control let 140. As a result, the caption display is performed on the video picture on the screen of the monitor 60.

On the other hand, in the modes other than the normal play mode such as, for example, Slow, Still, Cue, REV. etc., the controller 140 reads the caption display signals stored in the caption memory 110 and outputs the read caption display signals to the video/character signal combination circuit 50 for the predetermined time period.

Figure 4:
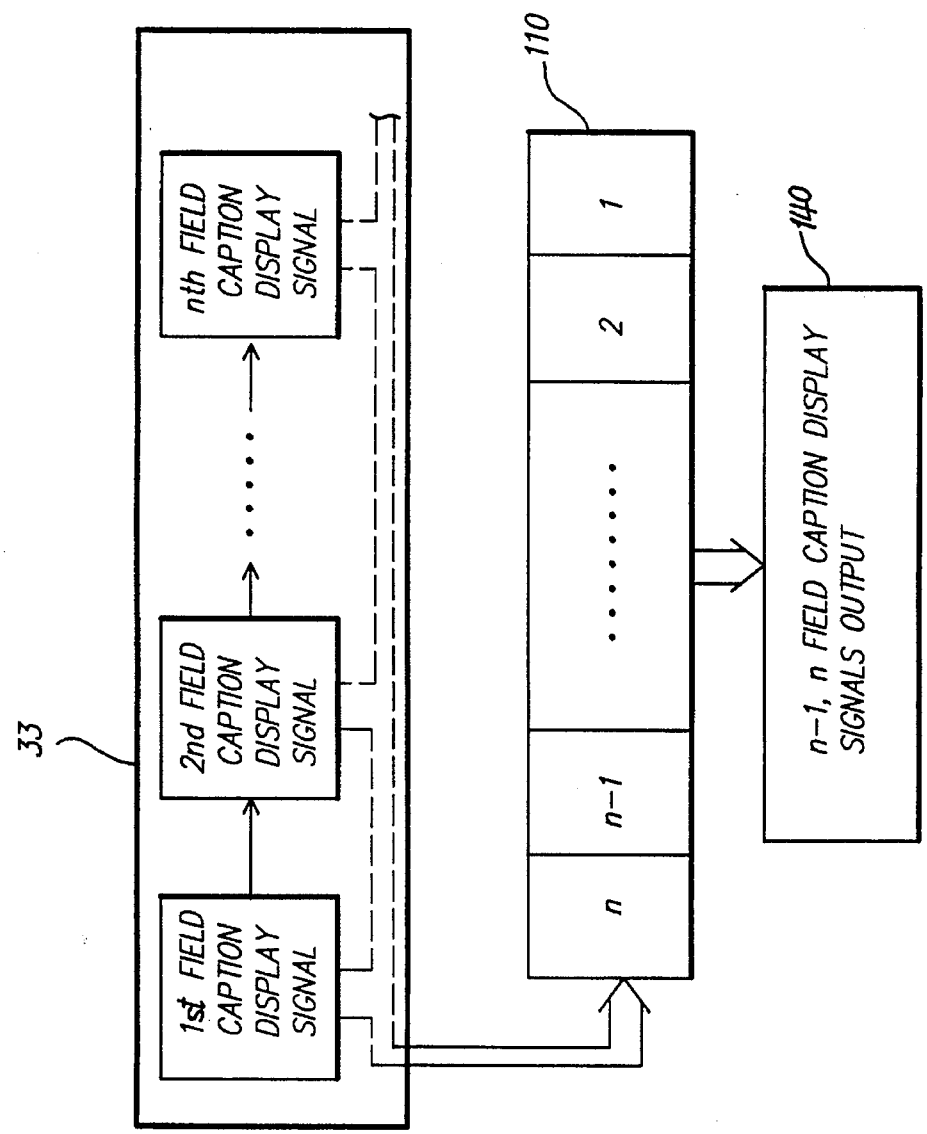
FIG. 4 is a view illustrating a manner of storing caption display signals in a caption memory in the caption control device of FIG. 3 in accordance with the present invention.

FIG. 4, illustrates storing the caption display signals in the caption memory 110 in the caption control device 100 of FIG. 3 in accordance with the present invention. The caption display signals are stored in the unit of field in the caption memory 110 under the control of the controller 140. Namely, the caption display signals which are inputted in sequence in the unit of field are stored in the caption memory 110, being shifted in the input order in the unit of field. In a case where the caption display signal newly inputted is stored at the start address of the caption memory 110 under the condition that the storage capacity of the caption memory 110 is entirely full with the caption display signals previously input, the caption display signal stored at the last address of the caption memory 110 is reset. In other words, the caption display signal stored first in the caption memory 110 is reset.

In a case of outputting the caption display signals stored in the caption memory 110 in the modes other than the normal play mode such as, for example, Slow, Still, Cue, the caption display signals stored at the last two addresses n and n−1 are outputted under the control of the controller 140. Namely, the caption display signals of the last two addresses or two fields n and n−1 are outputted synchronously with the video signal.

Also in a case where the user while watching the caption display signal being presently displayed would like to display the previously stored caption display signals, this can be accomplished by successively pushing a caption select key or an output address control key (not shown) on the key input unit 130 to control the output addresses of the caption memory 110. As a result, the caption display signals are output in sequence for display on the screen from the specified addresses to the last two addresses n and n−1.

For example, when the user would like to view the caption display in the slow mode, he or she selects the slow mode as the caption display mode through the key input unit 130. As a result, the controller 140 determines the slow mode as the caption display mode. The controller 140 checks whether the operating mode of the VCR is the slow mode. Upon checking that the operating mode of the VCR is the slow mode, the controller 140 controls the caption memory 110 in the read mode and addresses it. As a result, the caption display signals from the addressed locations of the caption memory 110 are outputted to the video/character signal combination circuit 50.

At this time, normally, the display time determination unit 150 controls such that the time period during which the caption display signal is outputted is in accord with the display time period in the normal play mode. If the user presets the caption display time period through the key input unit 130, the display time determination unit 150 retains the preset caption display time period and then the caption display signal is output for the preset caption display time period under the control of the display time determination unit 150.

As hereinbefore described, according to the present invention, there is provided the caption display apparatus for the VCR, which is capable of performing the caption display in any of the operating modes of the VCR such as Slow, Still, Cue, REV. etc. as well as the normal play mode under selection of the user. Also, the caption display can be performed on the specified video picture for the predetermined time period. Further, selected ones of the stored caption display signals can be displayed under selection of the user. Therefore, the present invention is very advantageous, particularly when it is applied to language study fields.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A caption display apparatus for a VCR for enabling captions to be displayed in a normal play mode of operation of the VCR and also in a non-normal play mode of operation of the VCR being among a slow mode, a cue mode, a still mode and a reverse mode, comprising:

caption signal detection means for detecting a caption signal from a video signal received from a video signal processing means of the VCR which processes luminance and chrominance signals of a video signal input thereto;

caption display signal generation means for generating a caption character signal in response to the detected caption signal from said caption signal detection means, determining a display size and a display window position of the generated caption character signal, and accordingly outputting caption display signals;

caption control means for receiving the caption display signals output from said caption display signal generation means, sequentially storing in a received order the received caption display signals in units of field for sequentially storing received caption display signals of n fields where n>2, and shifting the stored caption display signals in the received order in units of field as new caption display signals are received, in the normal play mode of operation of the VCR, said caption control means outputting the currently received caption display signals for a predetermined time period, in the non-normal play mode of operation of the VCR being among a slow mode, a cue mode, a still mode and a reverse mode, said caption control means outputting the last two fields of the stored caption display signals, field n and field n−1, synchronously with the video signal for the predetermined time period, in accordance with a user's selection, said caption control means ouputting the caption display signals previously stored in sequence from a stored field specified by the user's selection to the last two stored fields n and n−1 for the predetermined time period, and in accordance with a user's setting, said caption control means controlling the duration of the predetermined time period during which the caption display signals are output; and video/character signal combination means for combining the caption display signals output from said caption control means with the video signal from said video signal processing means and outputting the combined signals in a form displayable on a monitor so that a caption can be displayed on the monitor.

2. The caption display apparatus for a VCR of claim 1, wherein said caption control means comprises:

caption memory means for sequentially storing in units of field the caption display signals output from said caption display signal generation means, and having a capacity of n field where n>2 and being addressable for reading and writing said fields;

a key input means for inputting caption control key signals for caption display control by a user;

an address controller means for controlling read/write addresses from/into said caption memory means;

a display time determination means for determining the predetermined time period during which the caption display signals are output; and a controller means for controlling said address controller means and said display time determination means, in response to the caption control key signals from said key input means and in accordance with a play mode of operation of the VCR, to selectively output the caption display signals stored in said caption memory means to said video/character combination means for the predetermined period of time.

3. A caption display control apparatus for a VCR including a caption signal detection means for detecting a caption signal from a video signal received from a video signal processing means of the VCR which processes luminance and chrominance signals of a video signal input thereto, a caption display signal generation means for generating a caption character signal in response to the detected caption signal from the caption signal detection means, determining a display size and a display window position of the generated caption character signal and in accordance therewith outputting caption display signals, and a video/character signal combination means for combining caption display signals applied thereto with the video signal from the video signal processing means for outputting combined signals in a form viewable on a display monitor, whereby a caption can be displayed on the display monitor together with the video signal, the caption display control apparatus comprising:

caption control means operably interposed between the caption display signal generation means and the video/character signal combination means, for receiving the caption display signals from the caption display generation means, sequentially storing in a received order the received caption display signals in units of field for sequentially storing received caption display signals of n fields where n>2, and shifting the stored caption display signals in the received order in units of field as each new caption display signal is received, in a normal play mode of operation of the VCR, said caption control means applying the currently received caption display signals directly to the video/character signal combination means for a predetermined time period, in a non-normal play mode of operation of the VCR being among a slow mode, a cue mode, a still mode and a reverse mode, said caption control means applying two fields of the caption display signals, field n and field n−1, last stored in the video/character signal combination means synchronously with the video signal for the predetermined time period, in accordance with a user's selection, said caption control means applying the caption display signals previously stored in the video/character signal combination means in sequence from a stored field specified by the user's selection to the last two stored fields n and n−1 for the predetermined time period, and in accordance with a user's setting, said caption control means controlling the duration of the predetermined time period during which the caption display signals are applied to the video/character signal combination means.

* * * * *